(12) United States Patent
Moynihan et al.

(10) Patent No.: US 8,417,111 B2
(45) Date of Patent: Apr. 9, 2013

(54) OPTICAL NETWORK IN-BAND CONTROL PLANE SIGNALING, VIRTUALIZED CHANNELS, AND TANDEM CONNECTION MONITORING SYSTEMS AND METHODS

(75) Inventors: Jeffrey Scott Moynihan, Cumming, GA (US); Iwan Kartawira, Cary, NC (US); Alexander A. Smith, Marietta, GA (US); Vagish Madrahalli, Woodstock, GA (US); Kumaresh Malli, Alpharetta, GA (US); Purushothaman Saravanan, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 366 days.

(21) Appl. No.: 12/914,092

(22) Filed: Oct. 28, 2010

(65) Prior Publication Data

US 2012/0106948 A1 May 3, 2012

(51) Int. Cl.
*H04B 10/00* (2006.01)
(52) U.S. Cl. .................................. 398/1; 398/16; 398/58
(58) Field of Classification Search ................ 398/1, 16, 398/30, 58
See application file for complete search history.

(56) References Cited

U.S. PATENT DOCUMENTS

| | | | | |
|---|---|---|---|---|
| 6,577,594 B1 * | 6/2003 | Abbas et al. | | 370/222 |
| 6,735,736 B2 * | 5/2004 | Korall et al. | | 714/776 |
| 6,807,152 B1 * | 10/2004 | Hessler et al. | | 370/242 |
| 6,938,187 B2 * | 8/2005 | Brissette | | 714/43 |
| 6,956,874 B1 * | 10/2005 | Moore et al. | | 370/535 |
| 7,031,341 B2 * | 4/2006 | Yu | | 370/469 |
| 7,032,032 B2 * | 4/2006 | Loprieno | | 709/246 |
| 7,042,847 B2 * | 5/2006 | Gourley et al. | | 370/242 |
| 7,143,161 B2 * | 11/2006 | Brissette | | 709/224 |
| 7,554,923 B2 * | 6/2009 | Huck et al. | | 370/242 |
| 7,688,717 B2 * | 3/2010 | Huck et al. | | 370/222 |
| 7,760,620 B2 * | 7/2010 | Yan | | 370/216 |
| 8,189,485 B2 * | 5/2012 | Yan | | 370/241 |
| 8,259,733 B2 * | 9/2012 | Conklin et al. | | 370/395.51 |
| 2001/0043603 A1 * | 11/2001 | Yu | | 370/393 |
| 2004/0057453 A1 * | 3/2004 | Montgomery, Jr. | | 370/452 |
| 2004/0066750 A1 * | 4/2004 | Carson et al. | | 370/250 |
| 2004/0156325 A1 * | 8/2004 | Perkins et al. | | 370/299 |
| 2004/0184489 A1 * | 9/2004 | Brissette et al. | | 370/907 |
| 2005/0013241 A1 * | 1/2005 | Beller et al. | | 370/216 |
| 2005/0078607 A1 * | 4/2005 | Bellato et al. | | 370/248 |
| 2005/0086555 A1 * | 4/2005 | Langridge | | 714/4 |
| 2006/0126503 A1 * | 6/2006 | Huck et al. | | 370/225 |
| 2008/0049621 A1 * | 2/2008 | McGuire et al. | | 370/236.2 |
| 2008/0219661 A1 * | 9/2008 | Lanzone et al. | | 398/45 |
| 2008/0270785 A1 * | 10/2008 | Loprieno et al. | | 713/150 |
| 2010/0054731 A1 * | 3/2010 | Oltman et al. | | 398/1 |
| 2010/0172645 A1 * | 7/2010 | Liu et al. | | 398/25 |
| 2010/0272438 A1 * | 10/2010 | Conklin et al. | | 398/58 |

(Continued)

*Primary Examiner* — Agustin Bello
(74) *Attorney, Agent, or Firm* — Clements Bernard PLLC; Christopher L. Bernard; Lawrence A. Baratta, Jr.

(57) ABSTRACT

The present disclosure provides improvements with respect to in-band control plane signaling, virtualized channels, and tandem connection monitoring in optical networks utilizing Synchronous Optical Network (SONET), Synchronous Digital Hierarchy (SDH), Optical Transport Network (OTN), and the like. In an exemplary embodiment, the present disclosure includes an optical network operating a control plane with in-band signaling utilizing SONET/SDH path level overhead. In another exemplary embodiment, the present disclosure includes an optical network operating virtualized SONET/SDH or OTN channels with manually cross-connections at intermediate line terminating elements. In yet another exemplary embodiment, the present disclosure includes a tandem connection monitoring selection method across multiple operator domains.

20 Claims, 11 Drawing Sheets

U.S. PATENT DOCUMENTS

2011/0236018 A1* 9/2011 Valiveti et al. .................. 398/45
2011/0262128 A1* 10/2011 Madrahalli et al. ............... 398/2
2012/0106948 A1* 5/2012 Moynihan et al. .............. 398/10
2012/0177364 A1* 7/2012 Beller ............................. 398/16

* cited by examiner

| IEC | | | | TC-REI | TC-RDI | TC-API | | Interpretation |
|---|---|---|---|---|---|---|---|---|
| Bit 1 | Bit 2 | Bit 3 | Bit 4 | Bit 5 | Bit 6 | Bit 7 | Bit 8 | |
| 0 | 0 | 0 | 0 | X | X | X | X | TC-UNEQ |
| 0 | 0 | 0 | 1 | X | X | X | X | 1 BIP Error |
| 0 | 0 | 1 | 0 | X | X | X | X | 2 BIP Errors |
| 0 | 0 | 1 | 1 | X | X | X | X | 3 BIP Errors |
| 0 | 1 | 0 | 0 | X | X | X | X | 4 BIP Errors |
| 0 | 1 | 0 | 1 | X | X | X | X | 5 BIP Errors |
| 0 | 1 | 1 | 0 | X | X | X | X | 6 BIP Errors |
| 0 | 1 | 1 | 1 | X | X | X | X | 7 BIP Errors |
| 1 | 0 | 0 | 0 | X | X | X | X | 8 BIP Errors |
| 1 | 0 | 0 | 1 | X | X | X | X | 0 BIP Errors |
| 1 | 0 | 1 | 0 | X | X | X | X | Not Used |
| 1 | 0 | 1 | 1 | X | X | X | X | Not Used |
| 1 | 1 | 0 | 0 | X | X | X | X | Not Used |
| 1 | 1 | 0 | 1 | X | X | X | X | 0 BIP Errors, Incoming UNEQ |
| 1 | 1 | 1 | 0 | X | X | X | X | 0 BIP Errors, Incoming AIS |
| 1 | 1 | 1 | 1 | X | X | X | X | TC-AIS |
| X | X | X | X | 0 | 0 | X | X | No RDI-T/REI-T |
| X | X | X | X | 0 | 1 | X | X | TC-RDI/RFI |
| X | X | X | X | 1 | 0 | X | X | TC-REI |
| X | X | X | X | 1 | 1 | X | X | Not Used |
| X | X | X | X | X | X | Multiframe API | | TC-API |

*FIG. 5*

| Line Rate | Virtual Channel Rate | Concatenation Type |
|---|---|---|
| OC-192/STM-64 | STS-48/STM-16 (4 Virtual Channels) | STS-1/VC-3 |
| | | STS-3/VC-4 |
| | | STS-12c/VC-4-4c |
| | | STS-48c/VC-4-16c |
| | STS-24/STM-8 (8 Virtual Channels) | STS-1/VC-3 |
| | | STS-3/VC-4 |
| | | STS-12c/VC-4-4c |
| | | STS-24c/VC-4-8c |
| | STS-12/STM-4 (16 Virtual Channels) | STS-1/VC-3 |
| | | STS-3/VC-4 |
| | | STS-12c/VC-4-4c |
| OC-48/STM-16 | STS-24/STM-8 (2 Virtual Channels) | STS-1/VC-3 |
| | | STS-3/VC-4 |
| | | STS-12c/VC-4-4c |
| | | STS-24c/VC-4-8c |
| | STS-12/STM-4 (4 Virtual Channels) | STS-1/VC-3 |
| | | STS-3/VC-4 |
| | | STS-12c/VC-4-4c |
| | STS-3/STM-1 (16 Virtual Channels) | STS-1/VC-3 |
| | | STS-3/VC-4 |
| OC-12/STM-4 | STS-3/STM-1 (4 Virtual Channels) | STS-1/VC-3 |
| | | STS-3/VC-4 |

FIG. 6

| Line Rate | Virtual Channel Rate |
|---|---|
| OTU3/ODU3 | ODU2<br>(4 Virtual Channels) |
| | ODU1<br>(16 Virtual Channels) |
| | ODU0<br>(32 Virtual Channels) |
| OTU2/ODU2 | ODU1<br>(4 Virtual Channels) |
| | ODU0<br>(8 Virtual Channels) |

OPTICAL NETWORK IN-BAND CONTROL PLANE SIGNALING, VIRTUALIZED CHANNELS, AND TANDEM CONNECTION MONITORING SYSTEMS AND METHODS

FIELD OF THE INVENTION

The present invention relates generally to optical network. More particularly, the present invention relates to improvements with respect to in-band control plane signaling, virtualized channels, and tandem connection monitoring in optical networks utilizing Synchronous Optical Network (SONET), Synchronous Digital Hierarchy (SDH), Optical Transport Network (OTN), and the like.

BACKGROUND OF THE INVENTION

Optical networks using SONET, SDH, OTN, and the like are being deployed with corresponding control planes for control thereof. For example, the control plane may include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. Using SONET, SDH, OTN, etc., the control planes may utilize either in-band signaling (e.g., via overhead) or out-of-band signaling (e.g., via a separate data network) to communicate control plane messages. Disadvantageously, in-band control plane enabled links are not possible over submarine links or tunneling through other bandwidth provider networks. Specifically, intermediate line terminating (LTE) network elements block communications channels available to the control plane. Signaling for these links requires an out-of-band control plane network limiting flexibility of the control plane and greatly increasing restoration times and cost of the network.

Additionally, the deployment of heterogeneous payload control plane-enabled links across submarine links or tunneling through network provider networks with control plane un-aware intermediate line terminating equipment (LTE) network elements has not been possible. Previously, these links were required to be homogeneous; forcing the user to allocate the entire bandwidth to a single concatenation type and thus stranding available bandwidth. In order to support control plane signaling and routing through older line terminating equipment (LTE) which do not support SONET/SDH auto-concatenation, the user needed to be able to identify the manual concatenation type cross-connections at these intermediate LTE network elements to the control plane. In the same way, OTN cross-connections at intermediate network elements can limit the available bandwidth. This lack of flexibility leads to limited control plane functionality and added cost to the user.

Furthermore in OTN, Tandem Connection Monitoring (TCM) points provide one mechanism for service monitoring. Conventionally, users have to manually setup TCM monitoring points at individual nodes along with a type of monitoring, i.e. either as origination, termination or pass through layer to accommodate TCM monitoring across multiple nodes. Disadvantageously with respect to tunneling through other bandwidth provider networks, only a single operator connected to each of the networks or domains may monitor each path.

BRIEF SUMMARY OF THE INVENTION

In an exemplary embodiment, an optical network includes a plurality of interconnected network elements providing any of Synchronous Optical Network (SONET), Synchronous Digital Hierarchy (SDH), and Optical Transport Network (OTN) connections therebetween; a control plane operating between the plurality of interconnected network elements, wherein at least one of the plurality of interconnected nodes includes a network element which does not operate the control plane; and a mechanism for one of in-band signaling across the network element which does not operate the control plane and virtualized channel creation with the control plane over the network element which does not operate the control plane. Optionally, the plurality of interconnected network elements provide SONET or SDH connections therebetween; and wherein the mechanism for in-band signaling includes utilizing path overhead associated with the SONET or SDH connections. The in-band signaling utilizes a Tandem Communication Channel in the path overhead. The in-band signaling may utilize Z3 and Z4 bytes in the SONET/SDH path overhead. The in-band signaling may monitor a Tandem byte (N1) to monitor for faults. The Tandem byte (N1) may be modified to provide notification of any of Intermediate Error Count, Tandem Connection Remote Error Indication, Tandem Connection Remote Defect/Fault Indication, Tandem Connection Access Point Identifier, path Alarm Indication Signal, and path unequipped. A Path bit interleaved parity BIP-8 byte (B3) may be modified based upon the Z3, Z4, and N1 bytes. Optionally, the virtualized channel creation includes sub-dividing a SONET/SDH line or an OTN path into virtual channels; and establishing manual cross-connections on the network element which does not operate the control plane. The sub-dividing the SONET/SDH line is based on line rate and concatenation type and wherein the sub-dividing the OTN path is based on line rate and virtual channel rate. The control plane may be configured to advertise bandwidth and concatenation based on the virtual channels. The control plane is configured to reconfigure a virtual channel of the virtual channels without affecting adjacent channels of the virtual channels. Optionally, the plurality of interconnected network elements provide OTN connections therebetween; wherein the plurality of interconnected network elements are divided into two or more domains; and wherein the optical network further includes a tandem connection monitoring selection mechanism configured to provide end-to-end tandem connection monitoring on an OTN path traversing the two or more domains. The tandem connection monitoring selection mechanism includes selecting one of six tandem connection monitoring levels; and setting a mode of the one of six tandem connection monitoring levels at origination points and termination points in each of the two or more domains. The mode may include origination at an origination point in an origination domain and passthrough at a termination point in the origination domain, passthrough at an origination point in any intermediate domains and origination at a termination point in the intermediate domains, and passthrough at an origination point in a termination domain and termination at a termination point in the termination domain. The optical network may further include a control module at one or more of the plurality of interconnected network elements, wherein the control module is configured to provide control plane messages.

In another exemplary embodiment, an optical network method includes operating any of SONET, SDH, or OTN connections therebetween a plurality of interconnected network elements; operating a control plane operating between the plurality of interconnected network elements, wherein at least one of the plurality of interconnected nodes includes a network element which does not operate the control plane; and in-band signaling the control plane across the network element which does not operate the control plane via path level overhead. The optical network method may further include establishing one or more virtual channels including subdivisions of the SONET, SDH, or OTN connections through manual cross-connection at the network element which does not operate the control plane. The optical network method may further include monitoring and modifying the path level overhead to monitor for faults.

In yet another exemplary embodiment, a tandem connection monitoring (TCM) selection method includes operating an Optical Transport Network (OTN) across multiple domains including at least an origination domain and a termination domain; selecting one of six TCM levels for an end-to-end TCM across the multiple domains; setting the end-to-end TCM as an origination mode at an origination point in the origination domain and as a passthrough mode at a termination point in the origination domain; and setting the end-to-end TCM as a passthrough mode at an origination point in the termination domain and as a termination mode at a termination point in the termination domain. The multiple domains may further include an intermediate domain, and wherein the tandem connection monitoring (TCM) selection method further includes setting the end-to-end TCM as a passthrough mode at an origination point in the intermediate domain and as an origination mode at a termination point in the intermediate domain.

BRIEF DESCRIPTION OF THE DRAWINGS

The present invention is illustrated and described herein with reference to the various drawings, in which like reference numbers denote like method steps and/or system components, respectively, and in which:

FIG. 1A is a block diagram of an optical switch supporting in-band control plane signaling, virtualized channels, and tandem connection monitoring in optical networks utilizing SONET, SDH, OTN, and the like;

FIG. 1B is a network diagram of a network of a plurality of interconnected optical switches and an associated control plane supporting in-band control plane signaling, virtualized channels, and tandem connection monitoring in optical networks utilizing SONET, SDH, OTN, and the like;

FIG. 2 is a block diagram of redundant control modules (CMs) for the optical switch supporting in-band control plane signaling, virtualized channels, and tandem connection monitoring in optical networks utilizing SONET, SDH, OTN, and the like;

FIG. 5 is table of various bits and associated interpretation of the bits for the Tandem byte (N1) in the SONET/SDH overhead monitor used for in-band signaling;

FIG. 6 is a table of exemplary SONET/SDH virtual channels based on line rate and concatenation type;

FIG. 7 is a table of exemplary OTN virtual channels based on line rate and virtual channel rate;

FIG. 8 is a flowchart of a virtualized channel method for use with the optical switch, an optical network, and the like;

DETAILED DESCRIPTION OF THE INVENTION

In various exemplary embodiments, the present invention relates to improvements with respect to in-band control plane signaling, virtualized channels, and tandem connection monitoring in optical networks utilizing Synchronous Optical Network (SONET), Synchronous Digital Hierarchy (SDH), Optical Transport Network (OTN), and the like. Advantageously, the Tandem Connection and Tandem Communication Channel allows the deployment of control plane links across submarine networks and through network provider links with line terminating equipment (LTE) network elements. The use of the Tandem Connection monitoring of the Control Plane line greatly increases the control plane restoration times and eliminates the need for an expensive out-of-band control plane network. The use of virtual channels allows the deployment of heterogeneous concatenation control plane links across submarine networks and through network provider links with line terminating equipment (LTE) network elements. These network elements for various reasons are not included in the control plane. In the SONET/SDH case, the use of multiple concatenation types on a single link allows the network to maximize the efficiency of expensive leased bandwidth. The user does not need to lease multiple lines for different concatenation types resulting in network cost savings. The TCM selection method described herein allows for end-to-end OTN connection monitoring and operations, administration, and maintenance (OAM) at the TCM layer across different domains. Further, the TCM selection method allows mesh restoration within a single domain to provide service disruption time based on the TCM PM data and TCM defects control fault within the network instead of exposure to outside network faults.

Figure 1A:
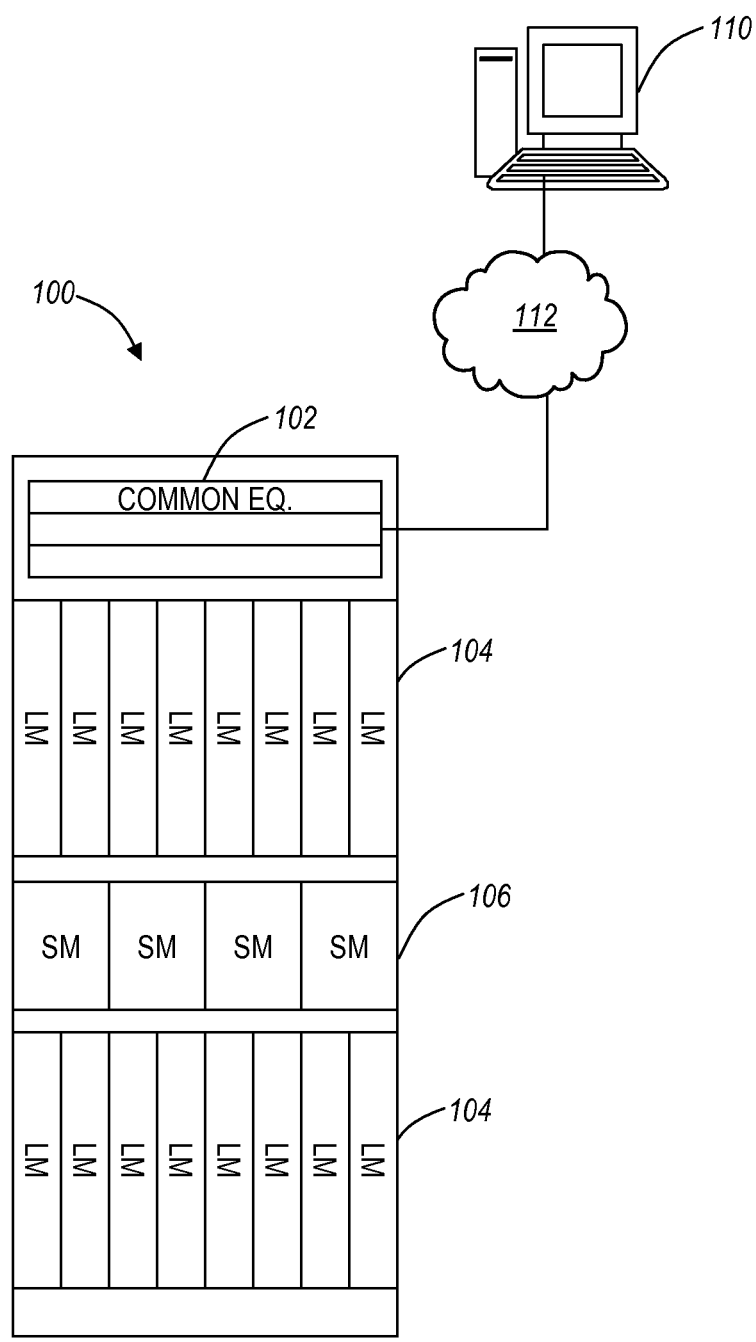

Referring to FIG. 1A, in an exemplary embodiment, an optical switch 100 is illustrated supporting in-band control plane signaling, virtualized channels, and tandem connection monitoring in optical networks utilizing SONET, SDH, OTN, and the like. The optical switch 100 is a network element (NE) that may consolidate the functionality of a multi-service provisioning platform (MSPP), SONET/SDH digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the optical switch 100 includes common equipment 102, line modules (LM) 104, and switch modules (SM) 106. The common equipment 102 may include power, a control module, operations, administration, maintenance, and provisioning (OAM&P) access, and the like. For example, the common equipment 102 may connect to a management system 110 through a data communication network 112. The management system 110 may include a network management system (NMS), element management system (EMS), or the like. Note, the management system 110 may support "Click and Go" provisioning of services. Additionally, the common equipment 102 may include a control plane processor configured to operate the control plane and the systems and methods described herein with regard to OTN mesh restoration.

The line modules 104 may be communicatively coupled to the switch modules 106, such as through a backplane, midplane, or the like. The line modules 104 are configured to provide ingress and egress to the switch modules 106, and are configured to provide interfaces for the OTN services described herein. In an exemplary embodiment, the line modules 104 may form ingress and egress switches with the switch modules as center stage switches for a three-stage switch, e.g. three stage Clos switch. The line modules 104 may include optical transceivers, such as, for example, 2.5 Gb/s (OC-48/STM-1, OTU1, ODU1), 10 Gb/s (OC-192/ STM-64, OTU2, ODU2), 40 Gb/s (OC-768/STM-256, OTU3, ODU4), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical switches 100, NEs, end clients, and the like. From a logical perspective, the line modules 104 provide ingress and egress ports to the optical switch 100, and each line module 104 may include one or more physical ports. Further, the switch 100 may include software and the like to track logical objects such as connection termination points, trail termination points, etc. associated with the line modules 104.

The switch modules 106 are configured to switch services between the line modules 104. For example, the switch modules 106 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 106 may include both Time Division Multiplexed (TDM) and packet switching engines. The switch modules 106 may include redundancy as well, such as 1:1, 1:N, etc. In an exemplary embodiment, the line modules 104 and the switch modules 106 are configured to manage and provide SONET, SDH, and OTN line signals. That is, the line modules 104 and the switch modules 106 may be line terminating in terms of SONET, SDH, and OTN overhead.

Figure 1B:
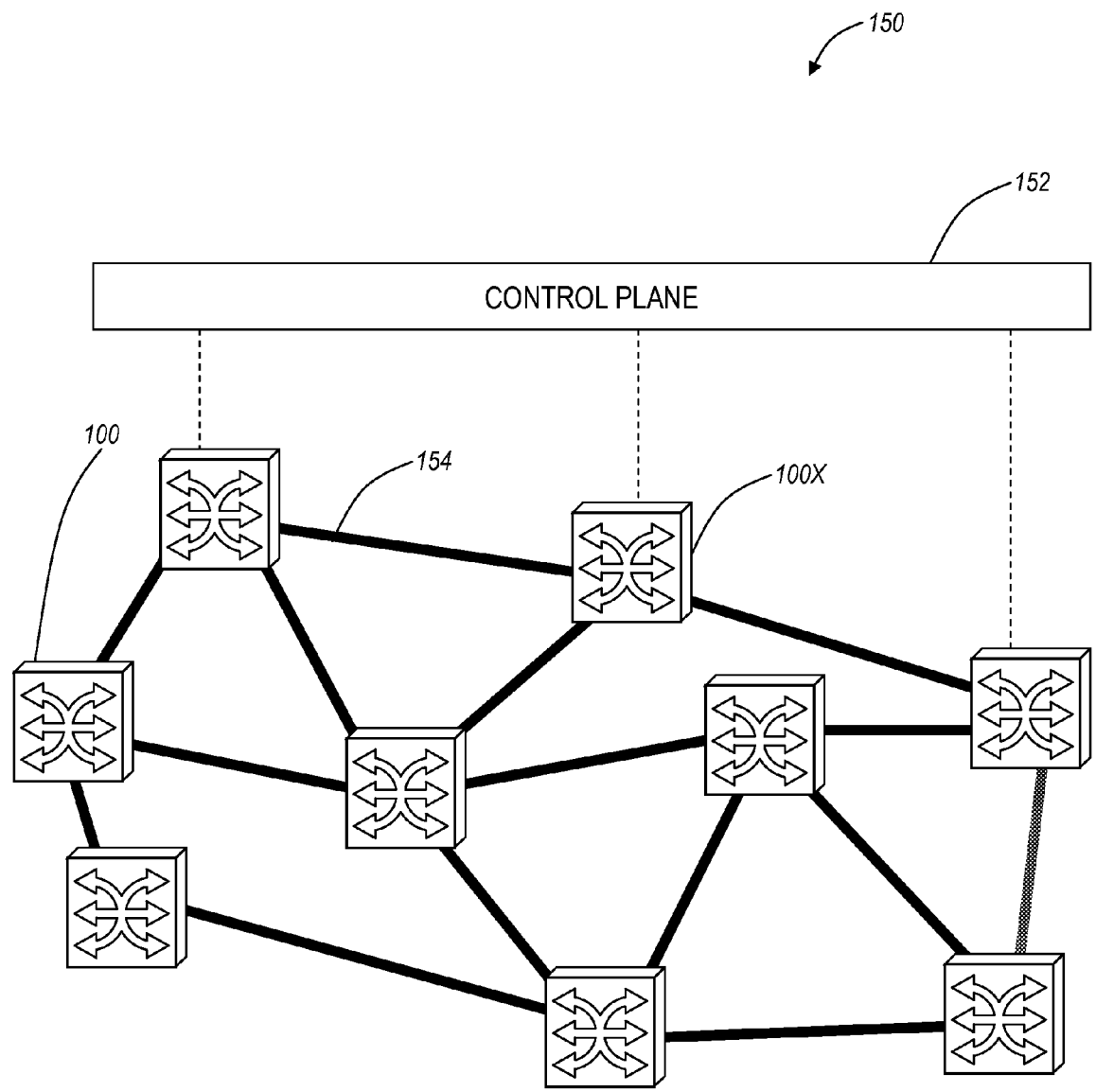

Referring to FIG. 1B, in an exemplary embodiment, a network 150 is illustrated with a plurality of interconnected network elements such as the optical switches 100. The network 150 is illustrated with the optical switches 100 forming a mesh architecture and those of ordinary skill in the art will recognize the systems and methods described herein are equally applicable to other architectures, such as rings, linear, and the like. The interconnected optical switches 100 are connected through a plurality of connections 154, which include optical fiber carrying one or more wavelengths between adjacent optical switches 100. The network 150 also includes a control plane 152 operating a signaling and routing protocol. For example, the control plane 152 can include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. The control plane 152 introduces intelligence in an optical transport system. It can perform many functions such as automatic resource discovery, distributing network resource information, establishing and restoring connections dynamically across the network, and the like. Accordingly, the control plane 152 is introducing layer two/three functionality in the optical network 150, i.e. the photonic layer, i.e. to communicate control plane information across a signaling communication network.

Of note, at least one of the optical switches 100, e.g. optical switch 100X in FIG. 1B, is a line terminating equipment (LTE) network element and does not participate in the control plane 152. For example, the optical switch 100X may be a legacy network element, may be a submarine LTE network element, may be from a different equipment vendor, may belong to another operator, or the like. In various exemplary embodiments, the present invention includes improvements allowing in-band control plane signaling, virtualized channels, and tandem connection monitoring in optical networks utilizing Synchronous Optical Network (SONET), Synchronous Digital Hierarchy (SDH), Optical Transport Network (OTN), and the like over the optical switch 100X. This despite the fact that the optical switch 100X is not a participant in the control plane 152.

Figure 2:
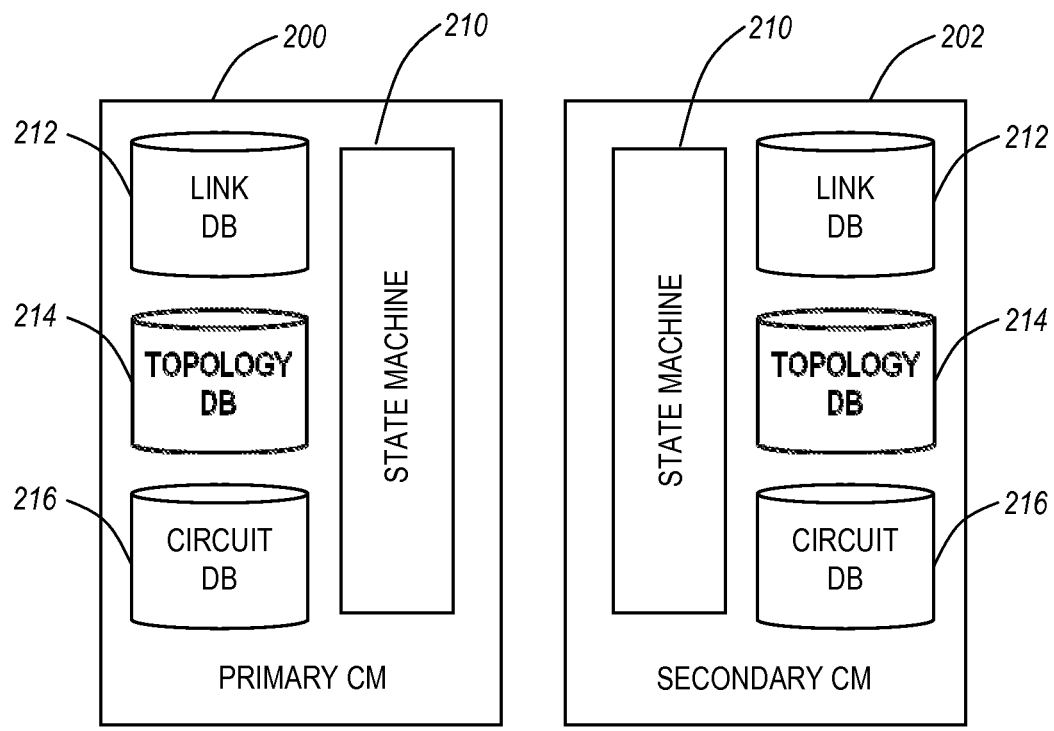

Referring to FIG. 2, in an exemplary embodiment, redundant control modules (CMs) 200, 202 for the optical switch 100 are illustrated. The CMs 200, 202 may be part of common equipment, such as common equipment 102 in the optical switch of FIG. 1. The CMs 200, 202 may include a processor which is hardware device for executing software instructions and associated memory. The processor may be any custom made or commercially available processor, a central processing unit (CPU), an auxiliary processor among several processors associated with the CMs 200, 202, a semiconductor-based microprocessor (in the form of a microchip or chip set), or generally any device for executing software instructions. When the CM 200, 202 is in operation, the processor is configured to execute software stored within memory, to communicate data to and from the memory, and to generally control operations of the CM 200, 202 pursuant to the software instructions.

The CMs 200, 202 may also include network interfaces, a data store, memory, and the like. The network interfaces may be used to enable the CMs 200, 202 to communicate on a network, such as to communicate control plane 152 information to other CMs. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane 152 information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 200, 202 include a state machine 210, a link database (DB) 212, a topology DB 214, and a circuit DB 216. The CMs 200, 202 are responsible for all control plane processing. For example, the control plane 152 may include OSRP, ASON, G-MPLS, or the like. In describing the exemplary embodiments herein, reference may be made to OSRP paths, links, legs, and lines. OSRP is a distributed protocol based on Private Network-to-Network Interface (PNNI)

designed for controlling a network of optical switches 100 or cross-connects (OXCs). OSRP introduces intelligence in the control plane of an optical transport system. It may perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention.

The CMs 200, 202 may be configured in a redundant 1+1, 1:1, etc. configuration. The state machine 210 is configured to implement the behaviors described herein with regard to OTN mesh networking The DBs 212, 214, 216 may be stored in the memory and/or data store. The link DB 212 includes updated information related to each link in a network. The topology DB 214 includes updated information related to the network topology, and the circuit DB 216 includes a listing of terminating circuits and transiting circuits at an NE where the CMs 200, 202 are located. The CMs 200, 202 may utilize control plane mechanisms to maintain the DBs 212, 214, 216. For example, a HELLO protocol can be used to discover and verify neighboring ports, nodes, protection bundles, and the like. Also, the DBs 212, 214, 216 may share topology state messages to exchange information to maintain identical data. Collectively, the state machine 210 and the DBs 212, 214, 216 may be utilized to advertise topology information, capacity availability, create and manage trail termination points, and provide connection management (provisioning and restoration). For example, each link in a network may have various attributes associated with it such as, for example, line protection, available capacity, total capacity, administrative weight, protection bundle identification, delay, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints. As is described herein, the CMs 200, 202 may provide a routing subsystem through the state machine 210 and the DBs 212, 214, 216.

Further, the CMs 200, 202 are configured to communicate to other CMs 200, 202 in other nodes on the network. This communication may be either in-band or out-of-band. For SONET networks, the CMs 200, 202 may use standard or extended SONET line or section overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing SONET, SDH, or OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3 R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 3:
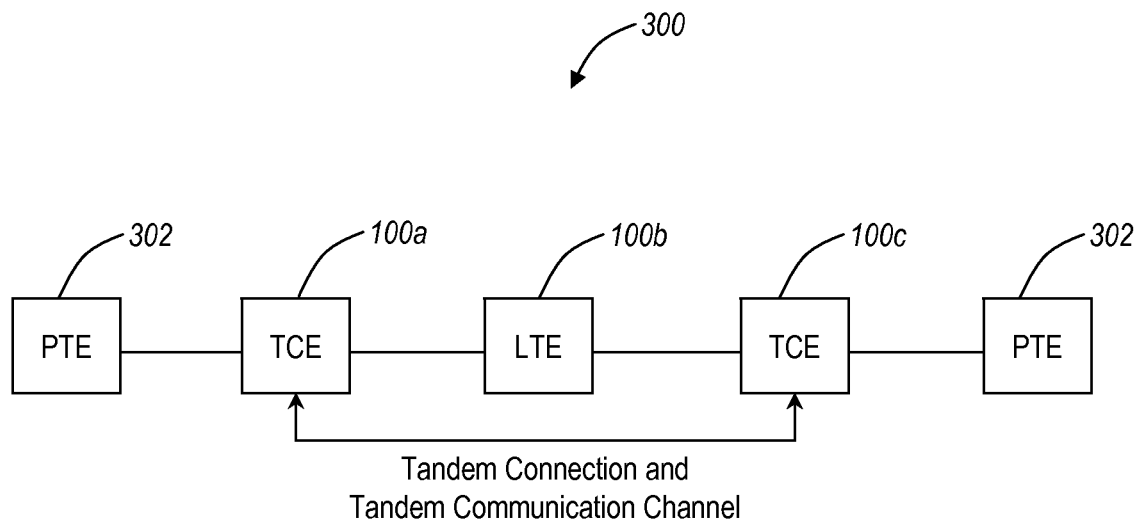
FIG. 3 is a network diagram of a network with interconnected optical switches supporting in-band control plane signaling over intermediate line terminating equipment (LTE)

Referring to FIG. 3, in an exemplary embodiment, a network 300 is illustrated with interconnected optical switches 100a, 100b, 100c. The network 300 is illustrated with three optical switches 100a, 100b, 100c interconnected in linear fashion with corresponding path terminating equipment (PTE) 302 connected through the optical switches 100a, 100b, 100c. Those of ordinary skill in the art will recognize that the network 300 may include other configurations including, but not limited to, rings, interconnected mesh, and the like. In this exemplary embodiment, the optical switches 100a, 100c are each tandem connection terminating equipment (TCE) with the optical switch 100b a line terminating equipment (LTE) between the optical switches 100a, 100c. As described herein, in-band signaling of control plane messages is problematic where the optical switch 100b is an intermediate LTE that does not transmit the control plane messages, that is the optical switch 100b does not participate in the control plane 152. In an exemplary embodiment, the network 300 utilizes SONET/SDH path overhead to provide communications across the intermediate LTE (the optical switch 100b) and to monitor the control plane line. In particular, the present invention may utilize the Tandem Communication Channel as a method of providing in-band signaling through intermediate LTEs.

Figure 4:
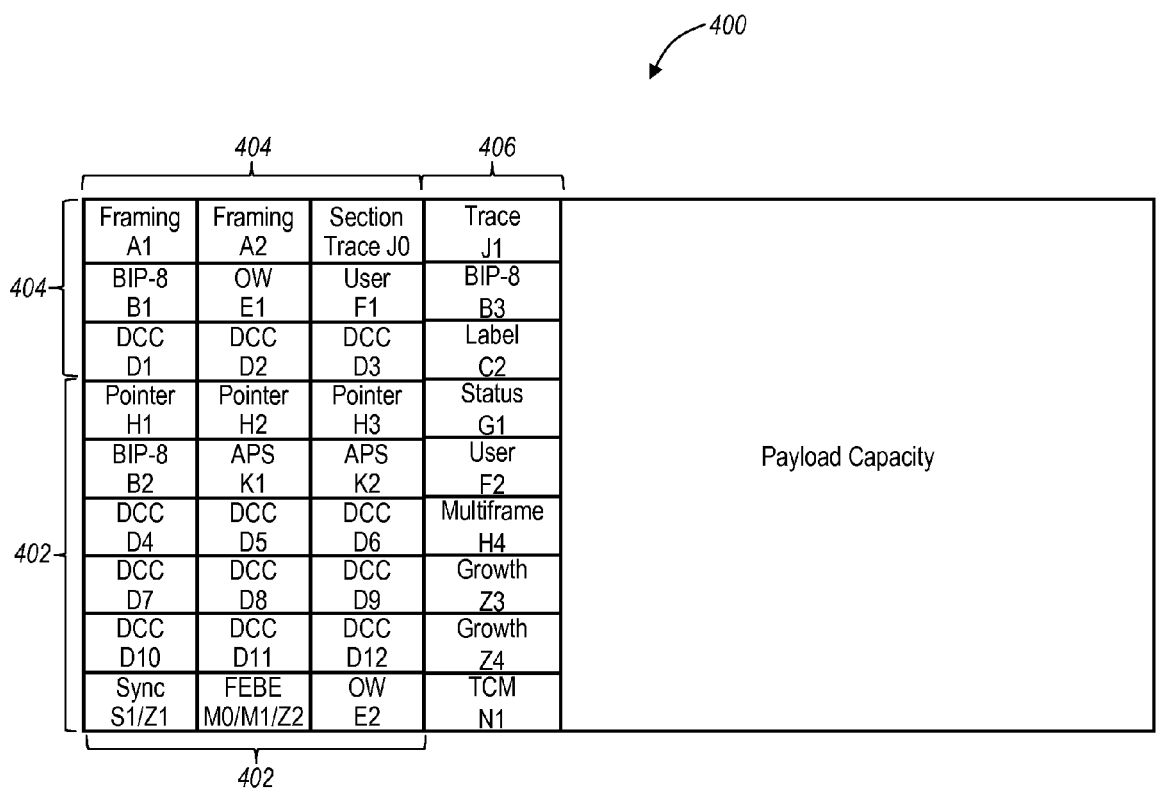
FIG. 4 is a diagram of a SONET/SDH frame showing line, section, and path overhead.

Referring to FIG. 4, in an exemplary embodiment, a SONET/SDH frame 400 is illustrated showing line 402, section 404, and path 406 overhead. Instead or in addition to using the line 402 and the section 404 overhead, the present invention utilizes the path 406 overhead to provide communications across intermediate line terminating (LTE) network elements and monitor the control plane line. In an exemplary embodiment, the communications channel between control plane network elements, i.e. the optical switches 100a, 100b, 100c, utilizes the unused Z3 and Z4 bytes in the SONET/SDH path 406 overhead to provide a 128 kbps communications channel. Since the intermediate optical switch 100b is SONET/SDH line terminating, the path 406 overhead passes transparently through the optical switch 100b. This channel is sufficient to provide control plane signaling through the intermediate LTE network element(s).

Additionally, the present invention must through the control plane line monitor for faults to ensure localized failures can be separated from failures not affecting the control plane line. The network can use a Tandem Connection between the control plane network elements, i.e. the optical switches 100a, 100b, 100c, to monitor for faults by utilizing the Tandem byte (N1) in the SONET/SDH overhead monitor the control plane line. Although, the tandem byte's use is standard, for the purposes of monitoring the control plane line, the functions of some bits must be altered. The control plane must be aware of incoming faults. Additionally, the control plane must be able to react immediately to remote faults within the Tandem Connection. The current Tandem Connection implementation does not provide for these needs.

Referring to FIG. 5, in an exemplary embodiment, a table 500 illustrates various bits and associated interpretation of the bits for the Tandem byte (N1) in the SONET/SDH overhead monitor. The tandem byte uses bits 1-4 as a modified Intermediate Error Count (IEC), bit 5 as a Tandem Connection Remote Error Indication (TC-REI) signal, bit 6 as a Tandem Connection Remote Defect/Fault Indication (TC-RDI/RFI), and bits 7-8 as a Tandem Connection Access Point Identifier (TC-API). The IEC field enables the far-end network element to adjust the SONET/SDH Path bit interleaved parity BIP-8 (B3) byte to account for any incoming Path BIP-8 errors. This functions as described in ITU-T G.707 Annex D. The IEC field also indicates an incoming path fault at the near-end network element. The fault can be either path Alarm Indication Signal (AIS) or path unequipped (UNEQ). Either fault will be signaled in the IEC field to the far-end network element. The far-end network element uses the IEC field to determine if a fault occurred within the tandem connection or before the tandem connection. The incoming faults will be identified as specific codes in the IEC, either Incoming UNEQ (1101) or Incoming AIS (1110). However, the faults occurring within the tandem connection and thus inserted by an intermediate network element as per standard, will have the IEC code of TC-UNEQ (0000) or TC-AIS (1111). Since the SONET/SDH standards direct an intermediate network element to insert all 0's for and unequipped signal or all 1's for a AIS signal. Using these IEC codes, the far-end network element can determine if a fault occurred inside the tandem connection link or before the tandem connection link. If a fault occurred within the tandem connection link, then the control plane enabled network element can disable the control plane line. Faults occurring outside of the tandem connection will have no effect on the control plane line.

Backward or remote fault signaling may be accomplished with bits 5 and 6 of the tandem connection byte (N1). If a far-end network element determines a fault occurred within the tandem connection link, then the Tandem Connection Remote Defect/Fault Indication (TC-RDI/RFI) signal is sent to the near-end network element. Similarly, if the far-end network element receives a path error (B3), then the Tandem Connection Remote Error Indication (TC-REI) signal is send to the near-end network element. If a TC-RDI/RFI is received at the near-end network element, then the control plane enabled network element can disable the control plane line. Faults occurring outside of the tandem connection will have no effect on the control plane line. The final two tandem connection byte (N1) bits 7 and 8 provide a multiframe Tandem Connection Access Point Identifier (TC-API) between the two tandem connection end points. The use and behavior of API is detailed in ITU-T G.707, Network node interface for the synchronous digital hierarchy (SDH).

The manipulation of the Tandem Connection byte (N1) and the Tandem Communication bytes (Z3 and Z4) affect the accuracy of the Path BIP-8 byte (B3). During the insertion and extraction of these bytes, the Path BIP-8 byte will need to be altered to accurately report any errors occurring on the path. This process is described in ITU-T G.707 Annex D. If a maintenance signal is received or if a maintenance signal is generated by the near-end network element, the Tandem Connection and Tandem Communication bytes must be inserted into the maintenance signal with the proper Incoming Error Code (IEC) code. The network element must also insert a valid Path BIP-8 byte (B3) and Pointer byte (H3). This insertion after the maintenance signal ensures the Tandem Communication channel is maintained during a maintenance condition, thus the control plane signaling for the line remains active.

Referring to FIGS. 6 and 7, in an exemplary embodiment, a table 600 illustrates exemplary SONET/SDH virtual channels based on line rate and concatenation type and a table 700 illustrates exemplary OTN virtual channels based on line rate and virtual channel rate. The virtual channel feature of the present invention provides the capability to sub-divide a SONET/SDH line or a ODUk path into virtual channels which match the manual cross-connections on the intermediate line terminating equipment (LTE) network element(s), i.e. the optical switch 100b. The control plane 152 utilizes the virtual channels to provide continuity across the LTE network, such as in the network 150. The Virtual Channels can be setup in any division of bandwidth, but the total bandwidth must equal the line rate of the optical signal. As shown in the table 600 and in the case of SONET/SDH, each virtual channel can have the same or different concatenation type. This concatenation type must be supported by the bandwidth allotted to the Virtual Channel. In order to maximize bandwidth, the concatenation type should be evenly divisible into the line rate. Otherwise some amount of the line rate will be unusable. The Virtual Channel bandwidth and the concatenation type is setup as a cross-connection at the LTE network element(s).

Once the Virtual Channels have been provisioned on the control plane enabled network elements and the proper cross-connections provisioned on the LTE network element(s), the control plane 152 can utilize the intermediate LTE network using the Virtual Channels. The control plane 152 advertises the Virtual Channel bandwidth and concatenation rather than the line rate bandwidth. This limits the possible sub-network connections (SNC) that can be setup across the link to those supported by the Virtual Channels. The control plane 152 monitors the available bandwidth on the Virtual Channels and adjusts the bandwidth advertisements. The control plane 152 must match SNC setup requests with the Virtual Channel's containing available bandwidth and in the case of SONET/SDH, supporting the requested concatenation type.

Failures on individual Virtual Channels may be treated the same as a failure of a line. Individual Virtual Channels can fail without affecting the adjacent channels. Failure of the line containing Virtual Channels causes failure of all the supported channels. The control plane 152 must take Virtual Channel into account when mesh restoring a SNC by matching the setup requests with the Virtual Channel's containing available bandwidth and in the case of SONET/SDH supporting the requested concatenation type.

Virtual Channels are reconfigurable without affecting adjacent channels if the bandwidth remains the same or does not intrude on the bandwidth of an adjacent channel. If the Virtual Channel is SONET/SDH, the concatenation type can be changed on a Virtual Channel without affecting an adjacent channel. The control plane 152 must adjust the bandwidth and/or concatenation type advertisements due to any reconfiguration of a Virtual Channel. Any SNC utilizing the reconfigured Virtual Channel may need to be re-routed to another path if the concatenation of the channel is changed. Any reconfiguration of the Virtual Channel must also be changed at the intermediate LTE network element(s).

Figure 8:
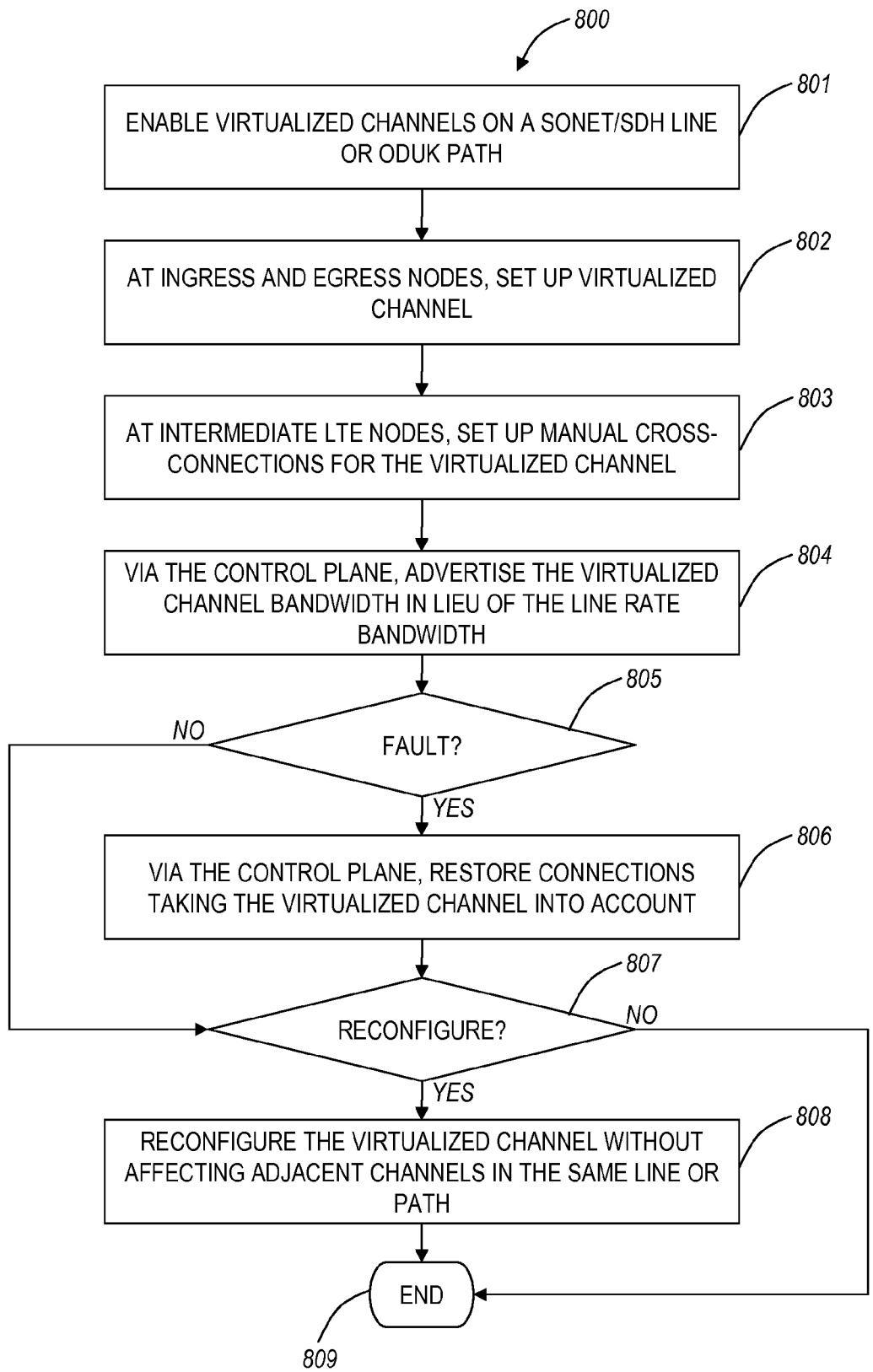

Referring to FIG. 8, in an exemplary embodiment, a flowchart illustrates a virtualized channel method 800 for use with the optical switch 100, the network 150, and the like. As described herein, the virtualized channel feature is enabled on the optical switch 100, the network 150, or the like via establishing virtualized channels on a SONET/SDH line or an ODUk path such as described in the tables 600, 700 (step 801). This may be enabled via the management system 110 or the like and communicated to the various elements. To establish a particular virtualized channel, the virtualized channel is set up at an ingress and egress node (step 802). At intermediate LTE nodes, manual cross-connections are established for the virtualized channel (step 803). The steps 802 and 803 may be accomplished via the management system 110 or the like. Alternatively, the steps 802 and 803 may be accomplished automatically via the control plane 152. Once setup, the virtualized channel bandwidth is advertised by the control plane 152 in lieu of advertising the line rate bandwidth (step 804).

If there is a fault (step 805), the connections are restored taking the virtualized channel into account, i.e. ensuring the virtualized channel may be restored on another channel or virtualized channel with the proper settings (step 806). If the virtualized channel is reconfigured (step 807), the virtualized channel is reconfigured without affecting adjacent channels in the same line or path (step 809), and the method 800 ends (step 810).

Figure 9:
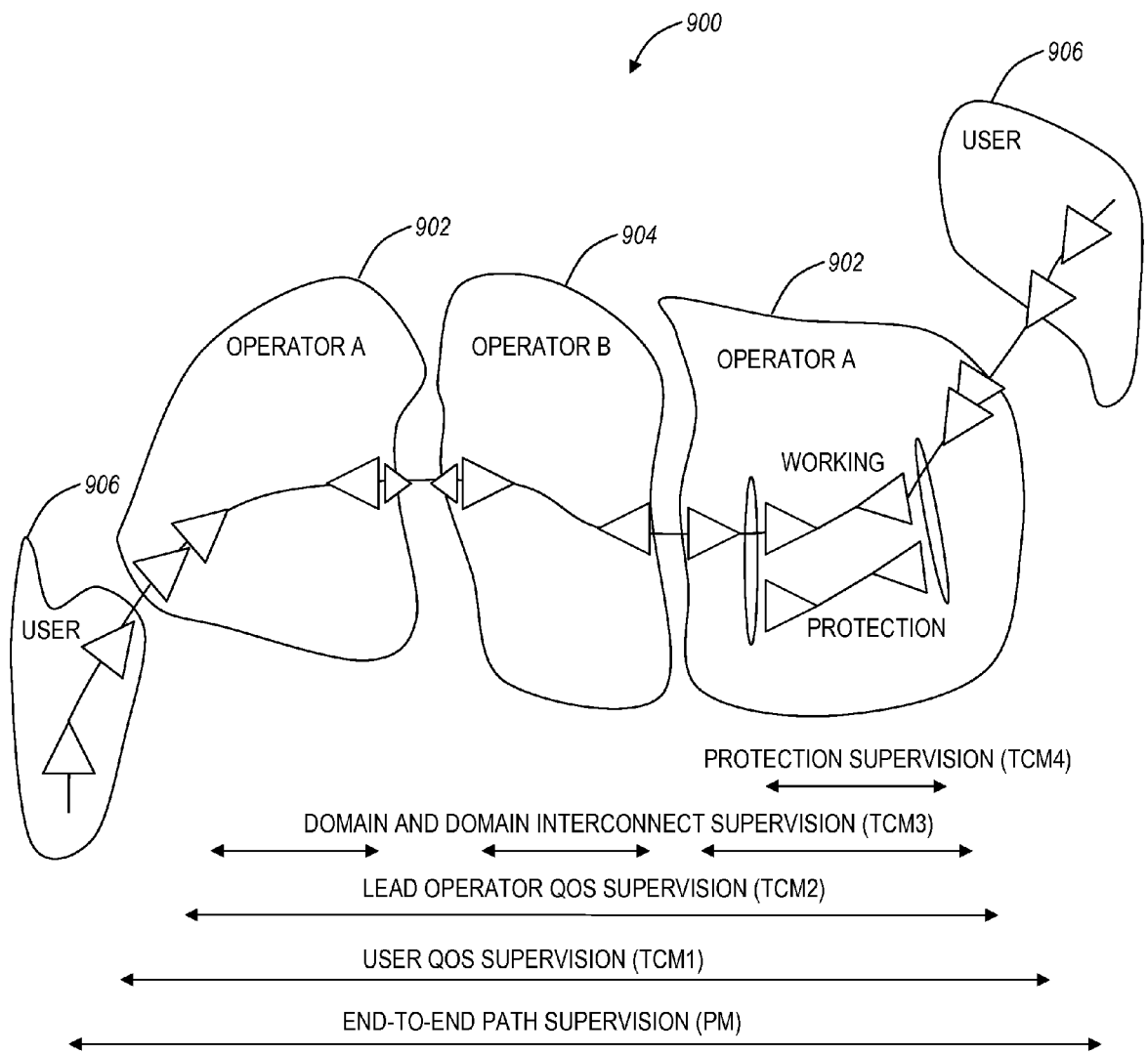
FIG. 9 is a network diagram an OTN network of various operator domains between a user showing tandem connection monitoring with TCM selection.

Referring to FIG. 9, in an exemplary embodiment, an OTN network 900 illustrates various operator domains 902, 904 between a user 906. OTN defines three points at which the service can be monitored, at the Section Monitor (SM) layer, Tandem Connection Monitor (TCM) layer, and Path Monitor (PM) layer. The SM layer is terminated at each handoff and allows for fault isolation to an individual span within the network. The PM layer provides an end-to-end measure of the service across the entire network. However, many services may cross multiple operator domains or even be carried via different vendors' equipment that is managed separately within a single carrier. TCM provides a method for monitoring the end-to-end performance of a circuit within a single carriers' domain. In addition to performance monitoring, the TCM layer can be used for protection applications such as Subnetwork Connection Protection (SNCP) or potentially SNC Integrity Check (SNCIC). In traditional SONET/SDH applications, the path layer is used for this purpose, but it can be influenced by errors which occur outside a given operators network and cause undesired protection switch events to occur within their network. Since TCM can isolate a service to a given domain, it can be used to trigger protection applications and avoid such issues.

The network 900 provides a network level TCM example for TCM usage. The network 900 utilizes OTN and includes the user 906 interconnected via network elements (such as the optical switches 100) through two different operator domains 902, 904. Note, the operators 902, 904 may include different service providers, different equipment vendors, and the like. While not illustrated, the SM layer provides isolation to the individual span. The end-to-end service is monitored by the PM layer, but that layer originates in the client's network and does not isolate the service level provided by a given operator. As the service is carried across the multiple domains 902, 904 of the operators illustrated, one of up to 6 TCM layers may be allocated to monitor the service within a given domain, to the end-to-end service provided by a given operator, or to facilitate a protection application within a given domain.

In an exemplary embodiment, the present invention utilizes the control plane 152 within one of the domains 902, 904 for establishing the TCM selection for a single connection end to end. In particular, the TCM selection is applicable to any connection with any bandwidth granularity (e.g., ODU2, ODU1, ODU0, ODUFlex, etc., where ODU refers to an Optical channel Data Unit level k). The control plane 152 can carry information such as type of mode at origination node, termination node and the TCM overhead byte that required to be monitored. Using the network 900 as an example of the TCM selection, the control plane 152 in the operator A domain 902 will have an origination point as TCM Origination, termination point as Pass through and TCM overhead byte as any number from 1 to 6 (Note that same number should be used in another domain). The control plane 152 in operator B domain 904 will have origination point as TCM Pass through, termination point as Origination and TCM overhead byte as any number from 1 to 6 (Note that same number should be used in another domain). The control plane in operator A domain 902 will have origination point as TCM Pass through, termination point as Termination and TCM overhead byte as any number from 1 to 6 (Note that same number should be used in another domain). Now the user can monitor the path layer from end to end for the same connection even though it is going across the different operator domains 902, 904. These above settings can be changed when a control plane connection is regroomed (because of a end point change, service class, different path) or when connection is administratively locked. Now there is a TCM connection end-to-end across the different domains 902, 904, and this TCM enabled connection can also be allowed for delay measurement at the path level.

The control plane 152 also creates ODUkT TCM layer (for the mesh restorable SNCP (MR-SNCP) switching action). If a TCM layer is chosen for the end-to-end, the system also auto-creates an ODUk Connection Termination Point (CTP_TCM Transparent Monitor point on each SNC of the MR-SNCP protection group facing the line. These monitor points may be used to monitor the health of the MR-SNCP working and protect SNC's. Specifically, these monitor points may provide information via the TCM level related to operation in the other domains. For other control plane connections which are not SNCPs, the TCM layer monitors faults for TCMi-dAIS (Alarm Indication Signal)/TCMi-dLCK (Locked Defect)/TCMi-dOCI (Open Connection Indication Defect) defects. These defects within the network will induce mesh restoration for the control plane connections. Mesh restoration for these defects can be controlled via administrative state field on that connection.

Figure 10:
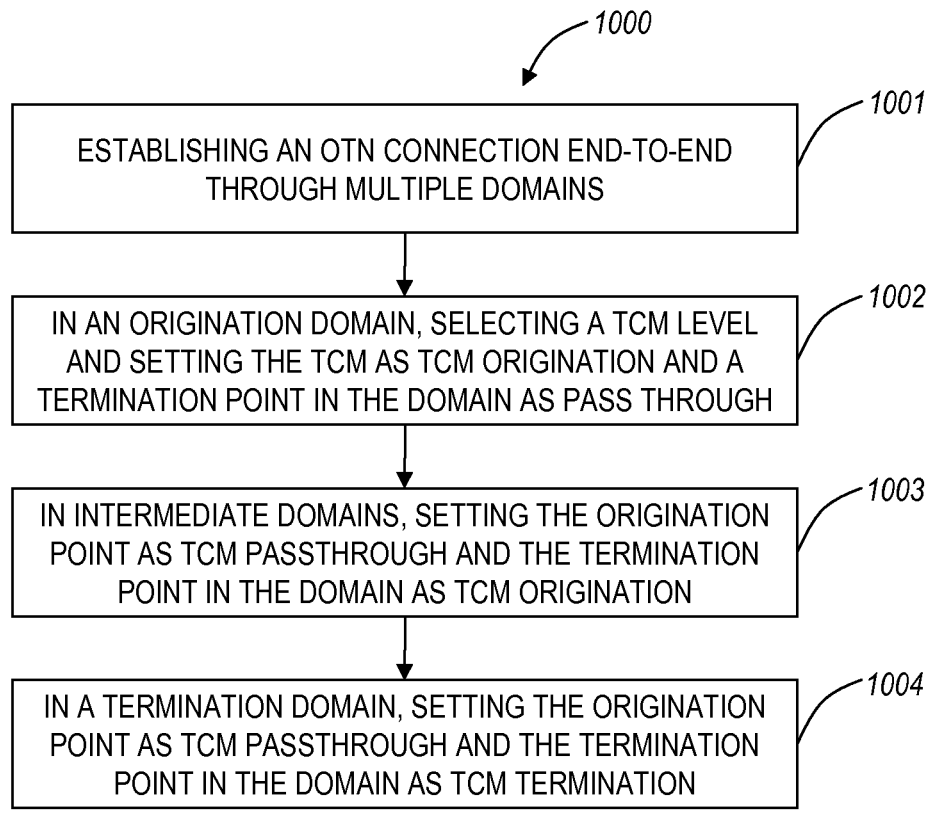
FIG. 10 is a flowchart of a TCM selection method for use with OTN networks over multiple domains.

Referring to FIG. 10, in an exemplary embodiment, a flowchart illustrates a TCM selection method 1000 for use with OTN networks over multiple domains. Specifically, the TCM selection method 1000 may be utilized with the optical switches 100, the optical network 150, the network 900, and the like to provide a single TCM layer for monitoring an end-to-end OTN connection despite traveling over different operator domains, different equipment vendors, and the like. First, an end-to-end OTN connection is established through multiple domains (step 1001). The multiple domains may include an origination domain, intermediate domains, and a termination domain. In the origination domain, a TCM level (i.e. one of TCM1 through TCM6) is selected and the TCM is set at an ingress or origination point in the origination domain as TCM Origination and at an egress or termination point in the origination domain as TCM Passthrough (step 1002). In the various intermediate domains, the ingress or origination point is set as TCM Passthrough and the egress or termination point as TCM Origination (step 1003). In the termination domain, the ingress or origination point is set as TCM Passthrough and the egress or termination point is set as TCM Termination (step 1004). In an exemplary embodiment, the TCM selection method 1000 may be implemented via the control plane 152 through control plane messages or the like.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. An optical network, comprising:
a plurality of interconnected network elements providing any of Synchronous Optical Network (SONET), Synchronous Digital Hierarchy (SDH), and Optical Transport Network (OTN) connections therebetween;

a control plane operating between the plurality of interconnected network elements, wherein at least one of the plurality of interconnected nodes comprises a network element which does not operate the control plane; and a mechanism for one of in-band signaling across the network element which does not operate the control plane and virtualized channel creation with the control plane over the network element which does not operate the control plane.

2. The optical network of claim 1, wherein the plurality of interconnected network elements provide SONET or SDH connections therebetween; and wherein the mechanism for in-band signaling comprises utilizing path overhead associated with the SONET or SDH connections.

3. The optical network of claim 2, wherein the in-band signaling utilizes a Tandem Communication Channel in the path overhead.

4. The optical network of claim 2, wherein the in-band signaling utilizes Z3 and Z4 bytes in the SONET/SDH path overhead.

5. The optical network of claim 4, wherein the in-band signaling monitors a Tandem byte (N1) to monitor for faults.

6. The optical network of claim 5, wherein the Tandem byte (N1) is modified to provide notification of any of Intermediate Error Count, Tandem Connection Remote Error Indication, Tandem Connection Remote Defect/Fault Indication, Tandem Connection Access Point Identifier, path Alarm Indication Signal, and path unequipped.

7. The optical network of claim 5, wherein a Path bit interleaved parity BIP-8 byte (B3) is modified based upon the Z3, Z4, and N1 bytes.

8. The optical network of claim 1, wherein the virtualized channel creation comprises:

sub-dividing a SONET/SDH line or an OTN path into virtual channels; and establishing manual cross-connections on the network element which does not operate the control plane.

9. The optical network of claim 8, wherein the sub-dividing the SONET/SDH line is based on line rate and concatenation type and wherein the sub-dividing the OTN path is based on line rate and virtual channel rate.

10. The optical network of claim 8, wherein the control plane is configured to advertise bandwidth and concatenation based on the virtual channels.

11. The optical network of claim 8, wherein the control plane is configured to reconfigure a virtual channel of the virtual channels without affecting adjacent channels of the virtual channels.

12. The optical network of claim 1, wherein the plurality of interconnected network elements provide OTN connections therebetween;

wherein the plurality of interconnected network elements are divided into two or more domains; and wherein the optical network further comprises a tandem connection monitoring selection mechanism configured to provide end-to-end tandem connection monitoring on an OTN path traversing the two or more domains.

13. The optical network of claim 12, wherein the tandem connection monitoring selection mechanism comprises:

selecting one of six tandem connection monitoring levels; and setting a mode of the one of six tandem connection monitoring levels at origination points and termination points in each of the two or more domains.

14. The optical network of claim 13, wherein the mode comprises origination at an origination point in an origination domain and passthrough at a termination point in the origination domain, passthrough at an origination point in any intermediate domains and origination at a termination point in the intermediate domains, and passthrough at an origination point in a termination domain and termination at a termination point in the termination domain.

15. The optical network of claim 1, further comprising a control module at one or more of the plurality of interconnected network elements, wherein the control module is configured to provide control plane messages.

16. An optical network method, comprising:

operating any of Synchronous Optical Network (SONET), Synchronous Digital Hierarchy (SDH), and Optical Transport Network (OTN) connections therebetween a plurality of interconnected network elements;

operating a control plane operating between the plurality of interconnected network elements, wherein at least one of the plurality of interconnected nodes comprises a network element which does not operate the control plane; and in-band signaling the control plane across the network element which does not operate the control plane via path level overhead.

17. The optical network method of claim 16, further comprising:

establishing one or more virtual channels comprising subdivisions of the SONET, SDH, or OTN connections through manual cross-connection at the network element which does not operate the control plane.

18. The optical network method of claim 16, further comprising:

monitoring and modifying the path level overhead to monitor for faults.

19. A tandem connection monitoring (TCM) selection method, comprising:

operating an Optical Transport Network (OTN) across multiple domains comprising at least an origination domain and a termination domain;

selecting one of six TCM levels for an end-to-end TCM across the multiple domains;

setting the end-to-end TCM as an origination mode at an origination point in the origination domain and as a passthrough mode at a termination point in the origination domain; and setting the end-to-end TCM as a passthrough mode at an origination point in the termination domain and as a termination mode at a termination point in the termination domain.

20. The tandem connection monitoring (TCM) selection method of claim 19, wherein the multiple domains further comprises an intermediate domain, and wherein the tandem connection monitoring (TCM) selection method further comprising:

setting the end-to-end TCM as a passthrough mode at an origination point in the intermediate domain and as an origination mode at a termination point in the intermediate domain.

* * * * *